(12) United States Patent
Mauti, Jr.

(10) Patent No.: US 9,363,646 B2
(45) Date of Patent: Jun. 7, 2016

(54) RECEIVING A SERVICE IN A VEHICLE BASED ON LOCATION DATA OF A MOBILE DEVICE WITHIN THE VEHICLE

(71) Applicant: General Motors LLC, Detroit, MI (US)

(72) Inventor: Thomas K. Mauti, Jr., Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 165 days.

(21) Appl. No.: 13/748,959

(22) Filed: Jan. 24, 2013

(65) Prior Publication Data

US 2014/0206392 A1  Jul. 24, 2014

(51) Int. Cl.
*H04W 24/00* (2009.01)
*H04W 4/04* (2009.01)
*H04L 29/08* (2006.01)
*H04W 4/02* (2009.01)
*H04M 3/51* (2006.01)
*H04W 4/22* (2009.01)

(52) U.S. Cl.
CPC .............. *H04W 4/046* (2013.01); *H04L 67/26* (2013.01); *H04M 3/5183* (2013.01); *H04W 4/023* (2013.01); *H04M 2242/30* (2013.01); *H04W 4/22* (2013.01)

(58) Field of Classification Search
CPC ....... H04W 4/046; H04W 4/023; H04W 4/22; H04L 67/26; H04M 3/5183; H04M 2242/30
USPC ..................... 455/456.3, 456.1, 434, 445, 457
See application file for complete search history.

(56) References Cited

U.S. PATENT DOCUMENTS

| | | | |
|---|---|---|---|
| 8,731,582 B2* | 5/2014 | Wold et al. ................. | 455/456.3 |
| 8,874,115 B2* | 10/2014 | Lim et al. ...................... | 455/437 |
| 2007/0139182 A1* | 6/2007 | O'Connor et al. ............ | 340/521 |
| 2008/0306682 A1* | 12/2008 | Dorfstatter et al. ........... | 701/207 |
| 2015/0026047 A1* | 1/2015 | Johnson, Jr. ........... | G06Q 50/30 |
| | | | 705/39 |

* cited by examiner

*Primary Examiner* — Khai M Nguyen
(74) *Attorney, Agent, or Firm* — Christopher DeVries; Reising Ethington P.C.

(57) ABSTRACT

A method and a system for providing a vehicle service to a vehicle based on the location data of a mobile device. The method carried out by the system includes a step of receiving at a call center vehicle location data from a vehicle. After receiving vehicle location data, the method may then include receiving at the call center mobile device location data from the mobile device. The method may include determining whether the mobile device is located within the vehicle based upon the vehicle location data and the mobile device location data. And if the mobile device is located within the vehicle, the method may include initiating at least one vehicle service from the call center in response to the determination.

14 Claims, 5 Drawing Sheets

RECEIVING A SERVICE IN A VEHICLE BASED ON LOCATION DATA OF A MOBILE DEVICE WITHIN THE VEHICLE

TECHNICAL FIELD

The present invention relates generally to determining a vehicle's location, and more particularly to determining the vehicle's location while engaged in a cellular voice call from the vehicle.

BACKGROUND OF THE INVENTION

Cellular devices may be used to communicate both voice and data. Some cellular communication standards may enable a wireless device to communicate voice and data simultaneously over a cellular network. One such known technology is GSM. Other cellular communication standards may enable transmission of voice or data over the cellular network, but not both simultaneously. One such example is CDMA.

In some situations, it may be desirable to acquire information or data associated with a subscriber (i.e., transmitted over the cellular network) while simultaneously being engaged in a cellular voice call with the subscriber.

SUMMARY OF THE INVENTION

According to an aspect of the invention, there is provided a method of providing a vehicle service to a vehicle based on the location data of a mobile device. The method includes a step of receiving at a call center vehicle location data from a vehicle. The method may include receiving at the call center mobile device location data (or mobile location data) from the mobile device. The method may include determining whether the mobile device is located within the vehicle based upon the vehicle location data and the mobile device location data. And if the mobile device is located within the vehicle, the method may include initiating at least one vehicle service from the call center in response to the determination.

In accordance with another aspect of the invention, there is provided a method of receiving vehicle services based on the location data of a mobile device. The method includes a step of initiating an opening of a voice channel or accepting an initiation of an opening of a voice channel for communication between a call center and a vehicle telematics unit. The method further includes a step of transmitting to the call center first location data associated with the vehicle; the transmission may be from the telematics unit over a data channel prior to opening the voice channel. And the method includes receiving a vehicle service initiated by the call center based on second location data associated with a mobile device that the call center has determined is within the vehicle. In addition, the determination may be made based upon the first location data and the second location data.

In accordance with another aspect of the invention, there is provided a computer-readable medium. The computer-readable medium may include a non-transitory data storage device upon which is stored instructions executable by a computer apparatus that cause the computer apparatus to determine whether a mobile device is within a vehicle associated with the mobile device. The computer-readable medium may also initiate a service for the vehicle. This may be accomplished using the instructions; when the instructions are executed by the computer apparatus, they may utilize location data received from the mobile device and from a telematics unit in the vehicle.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains providing vehicle services to a driver and/or other user within a vehicle. In some scenarios, the service may be initiated by a call center where the call center communicates a message or command to the vehicle to execute the service, or the service may be provided directly from the call center. Some vehicle services are location dependent and time-sensitive—e.g., turn-by-turn directions provided to a driver from an advisor at a call center. If the directions are not communicated in a timely manner, the driver may pass an important turn en route to the destination or even pass the destination entirely.

Some vehicles may have telematics equipment that allows an advisor at the call center to communicate with the driver over a voice channel. Skilled artisans will appreciate that some cellular communication standards (e.g., such as CDMA) will not allow the telematics equipment to communicate the vehicle position and/or heading to the call center while simultaneously engaged in voice communication. Therefore, the advisor may not know the precise location of the vehicle thereby inhibiting advisor from providing the driver with adequate turn-by-turn directions. Of course, turn-by-turn directions are merely one example of a vehicle service that may be provided by an advisor and/or a call center. The method below describes generally providing vehicle services associated with the vehicle's location in a timely manner.

Communications System—

Figure 1:
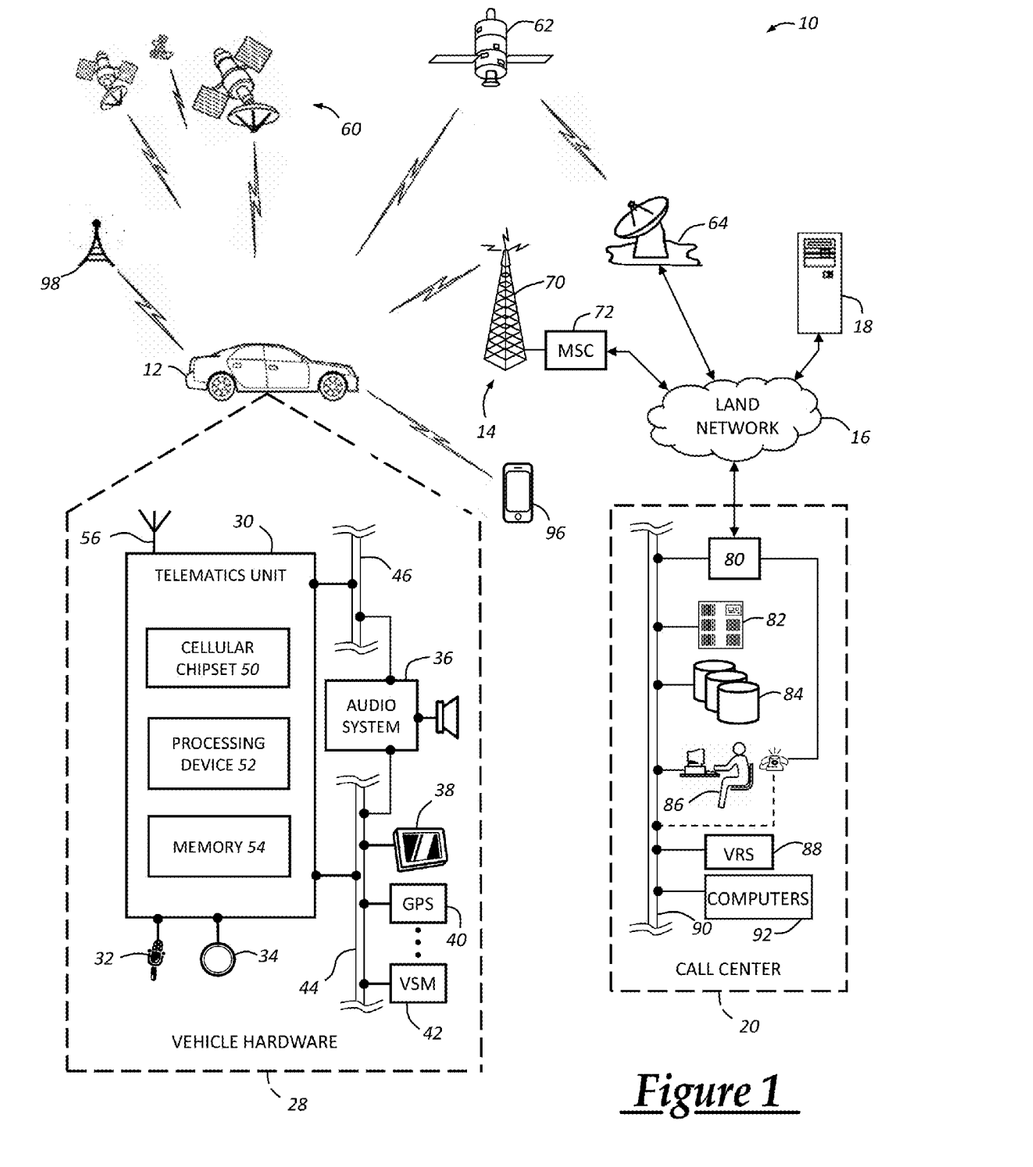
FIG. 1 is a block diagram depicting an exemplary embodiment of a communications system that is capable of utilizing the method disclosed herein.

Turning first to an exemplary operating environment of the method, with reference to FIG. 1, there is shown a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

In addition to the land network, intelligent transportation system (ITS) infrastructure may exist; e.g., having one or more ITS stations or roadside probes 98 for wirelessly receiving and collecting position and/or heading information from participating vehicles passing nearby. The probe 98 may have a transceiver for wirelessly notifying passing vehicles of its presence (e.g., pinging them). And participating vehicles may respond with their position and/or heading information. Typically, to protect the vehicle user's privacy, the acquired information may be anonymous. In some implementations, the ITS infrastructure may acquire the position and/or heading information for monitoring traffic operations, detecting transportation incidents (e.g., accidents, traffic-jams, etc.), and/or providing routing guidance to the public. ITS infrastructure and its usage is known to skilled artisans.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, computer apparatuses 92 coupled to the databases, servers, etc. (e.g., where the apparatuses each contain processors, memory, etc.), live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The call center 20 may implement various computer readable media and computer program products using the computers 92, servers 82, and/or databases 84, etc.

The computer readable medium is used to contain, store and carry instructions or programs for implementing processes in conjunction with the processor(s) 94. The computer readable medium directly includes computer-readable instructions, data structures, operating systems, application programs, program modules, computer software, computer program products and data. The data may be stored as look-up tables, formulas, algorithms, maps, models, and/or any other suitable formats. The computer program product may be executed on one computer or on multiple computers in communication with one another.

The computer program product includes firmware programs, hardware description language files, software programs, and program related data. The program related data can be in the form of data structures and/or look-up tables. The software programs are comprised of program instructions. The program instructions may be in the form of object code, executable code, and source code. The program instructions include program modules, routines, objects, components and programs. Some specific examples of program instructions include assembler, C, C++ objects, Visual Basic, Visual C++, XML, Java, Microsoft® Foundation Classes, Microsoft.net, visual.net, PERL, PHP, and SQL.

Computer programs include executable instructions for implementing logical functions and can be embodied in any computer-readable medium for use by or in connection with a processor that can retrieve and execute the instructions. Computer programs may exist in a variety of forms both active and inactive. Computer programs reside in different storage media associated with the computer. The computer programs are then executed by the processor. Computer programs may be installed or loaded into a secondary memory such as the mass storage device, dynamic storage device, or static storage device. Once executed by the processor, the computer programs may be loaded at least partially into a primary memory such as the internal memory. Programs may be embodied on non-transitory computer readable media. Non-transitory computer readable media may include computer system memory, semiconductor memory, computer to computer connections as well as all computer readable media except transitory propagating signals. Computer system memory may exist as ROM or RAM and semiconductor memory may exist as EPROM, EEPROM, flash memory, magnetic disks, tapes and/or optical disks. The computer to computer connections may be wired or wireless.

The operating environment may further include one or more handheld communications devices (HCDs) or mobile devices 96. The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. Such mobile device applications may include software applications, which may be preinstalled or installed by the user (or manufacturer) (e.g., using a graphical user interface or GUI). The hardware of the mobile device 96 may comprise: a display, a keypad (e.g., push button and/or touch screen), a microphone, one or more speakers, motion-detection sensors (such as accelerometers, gyroscopes, etc.), and a camera. In addition to the aforementioned features, modern mobile devices may support additional services and/or functionality such as short messaging service (SMS or texts), multimedia messaging service (MMS), email, internet access, as well as business and gaming applications. Non-limiting examples of the mobile device 96 include a cellular telephone, a personal digital assistant (PDA), a Smart Phone, a personal laptop computer having two-way communication capabilities, a netbook computer, or combinations thereof. The mobile device 96 may be used inside or outside of a mobile vehicle (such as the vehicle 12 shown in FIG. 1), and may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile device 96.

The mobile device 96 and the vehicle 12 may be used together by a person known as the vehicle user such as the driver. However, the vehicle user does not need to be the driver of the vehicle 12 nor does the vehicle user need to have ownership of the mobile device 96 or the vehicle 12 (e.g., the vehicle user may be an owner or a licensee of either or both).

Method—

As previously discussed, some vehicle services related to the vehicle's location may be time sensitive. Furthermore, skilled artisans will appreciate that there may be instances where the GPS module 40 in the vehicle may not be able to provide the call center with the vehicle's position in a timely enough manner. For example, some cellular communication standards may not permit the exchange of voice data over a voice channel simultaneous to the exchange of non-voice data over a data channel. Thus, if for example the vehicle user was communicating via the telematics unit 30 with the call center 20 over a voice channel, the telematics unit 30 may not be able to provide GPS data to the call center over a data channel without temporarily suspending voice channel communication. These temporary suspensions may hinder or nullify the call center's ability to provide quality service to the vehicle user. For example, if the voice communication pertained to navigation assistance, e.g., turn-by-turn directions, the user may pass his/her intended destination or a preferred turn to reach such a destination. Thus, in order for the call center to provide the user with up-to-date navigation assistance, it may be helpful to acquire the vehicle's geographical position during the voice call. One way to provide the vehicle's geographical position to the call center during usage of the voice channel it to have the user's mobile device 96 provide its geographical position directly to the call center, provided of course, the mobile device is traveling with the user.

Figure 2A:
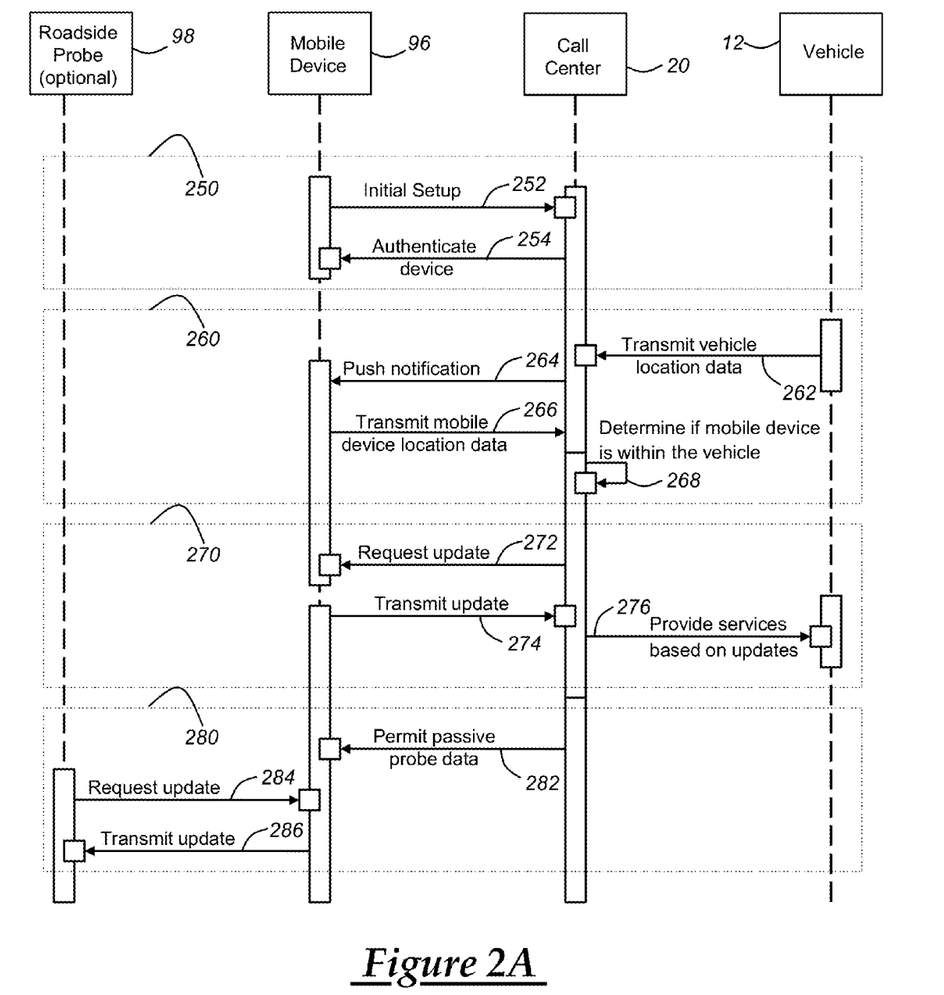
FIG. 2A is a flow diagram depicting an exemplary embodiment for determining a vehicle's position based on data received by a call center from the vehicle and a personal wireless device.

Turning now to FIG. 2A, there is shown a flow diagram depicting an exemplary embodiment for providing the vehicle's position data to the call center 20 using the mobile device 96. FIG. 2A illustrates various communications or wireless transmissions between the mobile device 96, the call center 20, and the telematics unit 30 in the vehicle 12. For example, there may be an authorization stage 250, a determination stage 260, a service stage 270, and an optional roadside probe stage 280. Each will be discussed hereafter; it should be appreciated each of the various embodiments of the disclosure described herein may include one or more these stages.

The authorization stage 250 may be used to securely associate the mobile device 96 with the vehicle 12 and/or the telematics unit 30. For example, the mobile device may belong to or be used by the vehicle user. Thus, prior to the call center 20 determining whether the mobile device and the vehicle are traveling together, it may be desirable for the call center to authorize or authenticate the mobile device (thereby associating the mobile device with the telematics unit). The mobile device may have a mobile application installed thereon to assist the call center with identifying the vehicle's location. The mobile application may require additional setup (e.g., by the user and/or a third party such as the call center) as will be appreciated by skilled artisans. This authorization may begin at step 252, initiating a setup request. The request from the mobile device may be communicated using a voice channel or a data channel; in response, the call center may authorize the mobile device via a voice or data channel. This authorization may or may not include the call center providing the mobile device with an acknowledgement and/or validation code [step 254]. Also, here the mobile device is illustrated as performing the initiating; however, the call center 20 could also initiate the authorization. Authentication techniques (e.g., including the use of encryption) are known to skilled artisans.

In the determination stage 260, the call center may determine instances when the vehicle and the associated mobile device are traveling together. These may be instances where it is possible for the location of the vehicle 12 to be determined by the location of the mobile device 96. As used herein, location data may include position data, clock data, and/or heading data. Position data may include latitude data ($\phi$) and longitude data ($\lambda$) or any other suitable coordinate system data (e.g., Cartesian, polar, spherical, etc.). Clock data may include timestamp data (ts) corresponding with the position data. And heading data may include speed data (v) and/or velocity data ( ). Stage 260 begins when the vehicle 12 (or telematics unit 30) transmits location data 262 to the call center 20. This may occur automatically in some instances when the user of the vehicle places a voice call to the call center. For example, when the vehicle user initiates a call to a call center advisor 86, the telematics unit 30 may automatically transmit its location data via a data channel prior to opening a voice channel connection with the advisor. Thus, the advisor may know the vehicle's location data at the time the call was received. Of course, if the vehicle 12 moves after the timestamp or timestamp data, the advisor may no longer know the vehicle's precise location. Upon receiving the vehicle location data during a call to a call center advisor, the call center 20 may send a push notification 264 to the mobile device 96. According to the mobile application's settings and instructions, the mobile device may automatically transmit its location data 266 to the call center in response to the push notification. The location data of the mobile device may also position data, clock data, and/or heading data. In one exemplary embodiment as will be explained below, the mobile device location data includes only position data and clock data. As will also be explained below, using the vehicle location data and the mobile device location data, the call center may determine whether the mobile device 96 is traveling with or within the vehicle 12 (e.g., by determining whether the mobile device is within a predetermined vicinity of the vehicle 12 and/or by comparing the heading data of the mobile device to the heading data of the vehicle).

The determining step 268 (i.e., determining whether the mobile device 96 is currently located within the associated vehicle 12) of FIG. 2A may occur at the call center 20 and may include accounting for the location data of the vehicle, the location data of the mobile device, various device and/or computer latencies (e.g., within the call center 20 and/or the mobile device 96), various transmission latencies (e.g., between the call center and/or the mobile device), and various statistical probabilities regarding the vehicle's acceleration and/or deceleration during the time between the vehicle transmission of its location [step 262] and the transmission of the mobile device location [step 266].

Figure 2B:
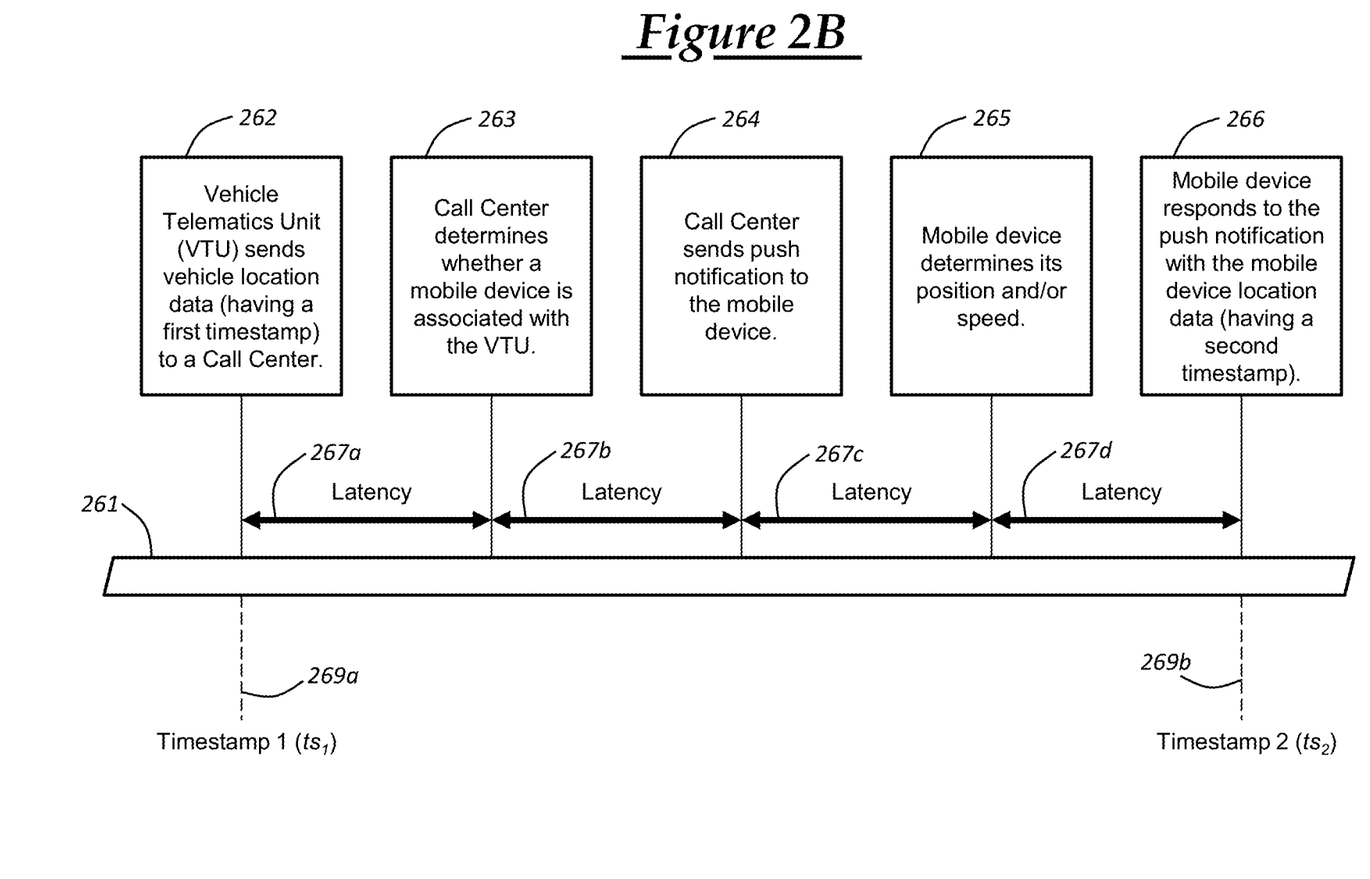
FIG. 2B is a diagram illustrating system latencies for the embodiment shown in FIG. 2A.

FIG. 2B illustrates at least some of the latencies described above along a timeline 261. For example, there is shown five sequential events or steps: 262, 263, 264, 265, and 266. Steps 262, 264, and 266 have been previously described and as illustrated in FIG. 2B represent the computational times for each respective step. Step 263 illustrates computational time at the call center while the call center determines whether the mobile device is associated with the telematics unit; and it may further include other processing or computational times. Similarly, step 265 illustrates the computational time at the mobile device including the determination of the mobile device location data; and it may further include other processing or computational times. As shown in FIG. 2B, a first timestamp ($ts_1$) 269a is associated with the vehicle location data, and a second timestamp ($ts_2$) 269b is associated with the mobile device location data. Between the two timestamps are a series of latencies (267a, 267b, 267c, 267d) where each of the steps 262, 263, 264, 265, and 266 are separated by one of the latencies, and the first timestamp 269a coincides with and initiates the beginning of the first latency (267a) and the second timestamp coincides with and occurs at the end of the last latency (267d). The length of the latencies may vary. And it will be appreciated that other latencies may exist and that the illustrated latencies are merely exemplary.

In one exemplary embodiment, the determining step 268 may relate an estimated first distance to an estimated second distance. The estimated first distance may use the following formula: distance ($d_1$) is equal to speed (v) multiplied by time (t) [$(d_1)=v*t$]. The speed data (v) may be acquired from the vehicle location data. And the clock data may be based upon both the vehicle and the mobile device's reported location data—e.g., the time (t) may be equal to the difference between the two respective timestamps (e.g., $ts_2-ts_1$).

The determining step 268 may use the following formula to determine the second distance: distance ($d_2$) is equal to the square root of the quantity the sum of two squared quantities—the first squared quantity being the difference of the latitudes ($\phi_1$, $\phi_2$, where $\phi_1$ is the latitude data of the vehicle and $\phi_2$ is the latitude data of the mobile device) and other squared quantity being the difference of the longitudes ($\lambda_1$, $\lambda_2$, where $\lambda_1$ is the longitude data of the vehicle and $\lambda_2$ is the longitude data of the mobile device) [$d_2=\sqrt{((\phi_2-\phi_1)^2+(\lambda_2-\lambda_1)^2)}$].

After the values for $d_1$ and $d_2$ have been determined, the determining step 268 may assess the values according to a predetermined relationship. For example, the relationship between $d_1$ and $d_2$ may be a ratio such that the value of $d_1$ is within 40% of the value of $d_2$. The 40% may take into account the statistical probabilities of the vehicle accelerating and decelerating during the latency time; i.e., between the two timestamps ($ts_1$, $ts_2$). For example, if $d_1$=100 kilometers (km) and $d_2$=120 km, then the determining step 268 would determine that the mobile device is traveling within the vehicle, because 100 km is within the range of 72 km≤$d_1$≤168 km, where 72 km is 40% less than 120 km and 168 km is 40% more than 120 km.

Other embodiments may also exist. For example, the relationship between $d_1$ and $d_2$ may be a ratio such that the value of $d_2$ is within 40% of the value of $d_1$. In another embodiment, the relationship between $d_1$ and $d_2$ may further depend upon the global position of the vehicle (e.g., GPS coordinates). For example, if the vehicle is traveling on an interstate highway for example, where speeds are typically more uniform, then the relationship between $d_1$ and $d_2$ may be a ratio such that the value of $d_1$ is within 20% of the value of $d_2$ (rather than 40%). In some instances, this 20% rule may only apply at certain times of day (e.g., times other than rush-hour, at night, etc.).

In yet another embodiment, the heading data of the mobile device may be used. For example, the determination step 268 may depend at least partially upon whether the heading data of the vehicle 12 is within a predetermined range of the heading data of the mobile device 96. For example, whether the heading of the vehicle (i.e., based upon the vehicle's heading data) is within 90° of the heading of the mobile device (i.e., based upon the mobile device's heading data). This comparison may include speed data (v) and/or direction data (e.g., using the vector component of velocity, ).

In yet another embodiment, the mobile device may send location data multiple times in response to the push notification (i.e., step 266 may be repeated multiple times or for some predetermined number of times). For example, the mobile device may provide five responses [step 266] to the push notification within a predetermined amount of time (e.g., within 30 seconds) (e.g., each response having a set of location data including different timestamps $ts_2$, $ts_3$, $ts_4$, $ts_5$, $ts_6$). An average may be taken of the mobile device's speed data and its direction data; and this data may be compared to the vehicle data to assist in the determination [268].

Once the determination [268] has been made that the mobile device is traveling in or with the vehicle 12, a vehicle service may be provided (returning the FIG. 2A). In the service stage 270, the call center 20 requests an update from the mobile device 96 [step 272] of the mobile device's location data. The mobile device may respond by transmitting an update at step 274. And at step 276, the call center may provide the vehicle with the service based on the update. In one embodiment, the advisor at the call center may use the updated location data from the mobile device to verbally advise or instruct the vehicle user during the voice call (e.g., providing more accurate turn-by-turn directions). Other embodiments exist; e.g., a vehicle service may be provided to the user via the telematics unit 30 without requesting the update [step 272] and/or without the mobile device transmitting the update; i.e., steps 272 and/or 274 are optional. The omission of these steps may be dependent upon a latency associated with the determination step 268; e.g., if the latency is relatively short, the steps may be omitted. In another embodiment, where the latency associated with the determination step is greater than a predetermined length or when a predetermined amount of time expires since the acquisition of the mobile device's position data [at step 266], only then does the call center request and receive an update [steps 272, 274].

The vehicle service is not limited to providing oral instruction or advice to vehicle user. The advisor at the call center may perform other functions beneficial to the vehicle user based on the updated location data. In addition, some vehicle services may include the advisor transmitting a message/command to the vehicle; e.g., placing the voice call on hold temporarily to perform vehicle service. Skilled artisans will appreciate other techniques of providing a message, a command, or an instruction to the vehicle while engaged in a voice call.

It should be appreciated that steps 272, 274, and 276 may be repeated. For example, the mobile device may periodically transmit an update of its location during the voice call between the telematics unit 30 and the call center 20. In some instances, only steps 274 and 276 may be repeated (i.e., it may not be necessary for the call center to request the update 272). For example, the mobile device may periodically transmit an update according to a predetermined pattern or scheme (e.g., every 30 seconds).

Now turning to another embodiment (see FIG. 2A), in the roadside probe stage 280, roadside probes 98 optionally may collect location data from the mobile device following the determination [268] that the mobile device is traveling with the vehicle 12. The mobile application on the mobile device may include instructions for executing this procedure. The location data provided by the mobile device may include all or part of its position data, its clock data, and its heading data. As will be understood by skilled artisans, when the vehicle 12 is not engaged in a voice call (e.g., with the call center 20), the vehicle telematics unit may communicate with the roadside probes 98 over a data channel and in some instances utilizing the cellular network. However as in the previous example, where the telematics unit 30 is engaged in a voice call, the mobile device 96 may provide all or part of the location data to the roadside probes. In one embodiment, the call center 20 may send a data message and/or instruction to the mobile device commanding it to be temporarily responsive to roadside probes [step 282]. And the mobile device may be responsive accordingly to this data message; i.e., when a roadside probe 98 requests an update [step 286], the mobile device may transmit the update [step 286]. In another embodiment, the vehicle telematics unit 30 may communicate with the mobile device 96 via a short range wireless communication (such as Bluetooth or Wi-Fi Direct) and instruct it to be responsive to roadside probes 98 during any instances or periods when the telematics unit is engaged in a voice call.

Figure 3:
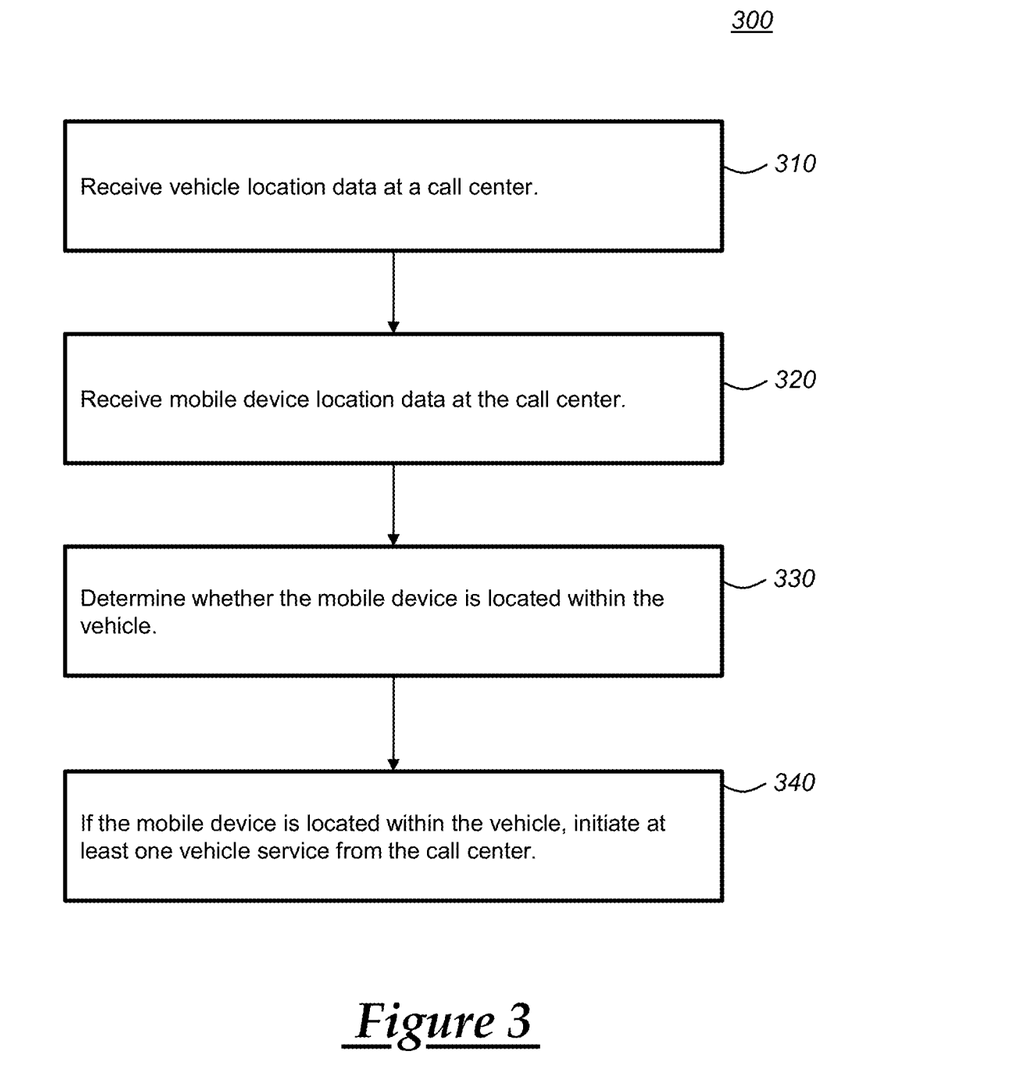
FIG. 3 is a flowchart of one exemplary method of the present disclosure.

Now turning to FIG. 3, the figure illustrates one exemplary method 300 of the present disclosure. The method begins at step 310—receiving the vehicle's location data at the call center 20. At step 320, the mobile device location data is received at the call center. The receipt of both location datas (e.g., from the vehicle and the mobile device) may be according to the afore-described method. At step 330, the call center may determine whether the mobile device is located within the vehicle. And at step 340, if the mobile device is located within the vehicle, the call center may initiate at least one vehicle service—such as turn-by-turn directions.

Figure 4:
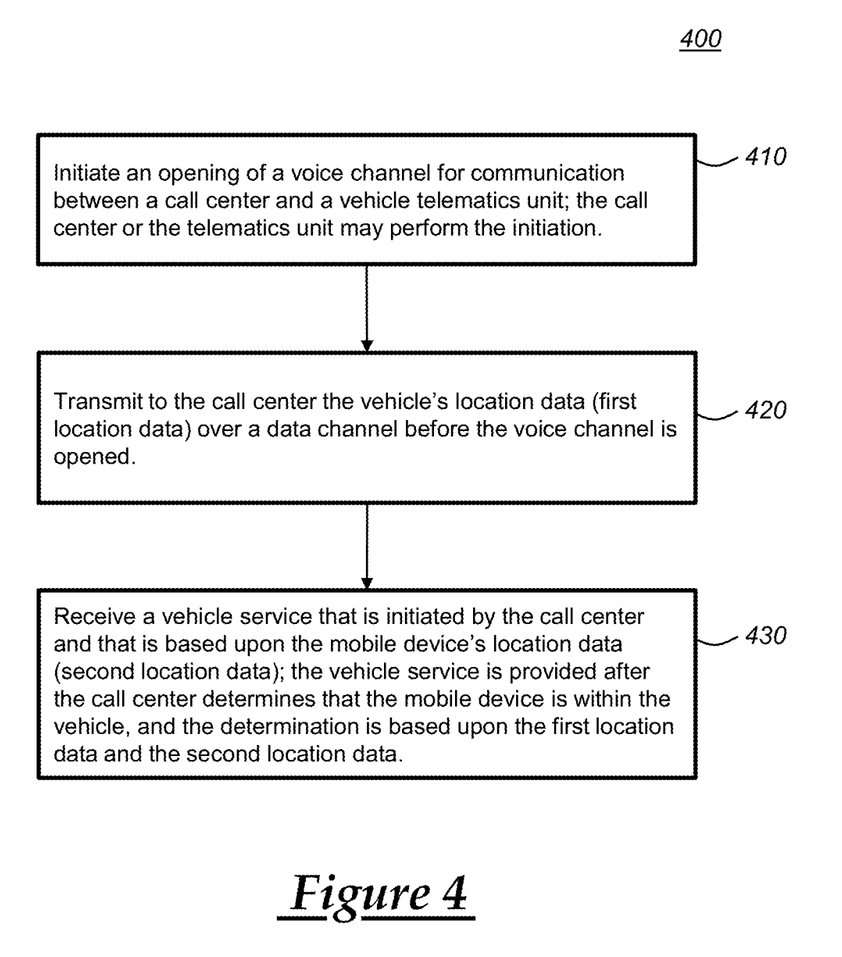
FIG. 4 is a flowchart of another exemplary method of the present disclosure.

Now turning to FIG. 4, the figure illustrates one exemplary method 400 of the present disclosure. The method begins at step 410—initiating an opening of a voice channel (or alternatively accepting an invitation of an opening a voice channel). The voice channel may be used for communication between an advisor 96 at the call center and a user at the vehicle 12 via the telematics unit. At step 420, the vehicle location data (or first location data) is transmitted to the call center over a data channel prior to the opening of the voice channel. As will be appreciated by skilled artisans, using known (e.g., CDMA) techniques, data may be transferred when opening a voice call—by first sending data over the data channel and then by opening the voice channel. Finally at step 430, a vehicle service may be initiated by the call center and received at the vehicle (e.g., for the user). The receipt of the vehicle service may be dependent upon the call center receiving mobile device location data (or second location data), and determining that the mobile device is within the vehicle. This determination may be based at least in part on the first and second location data.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing a vehicle service to a vehicle based on the location data of a personal wireless device, comprising the steps of:
   receiving at a call center vehicle location data from a vehicle;
   receiving at the call center mobile device location data from a mobile device;
   determining whether the mobile device is located within the vehicle based upon the vehicle location data and the mobile device location data; and
   when the mobile device is located within the vehicle, initiating at least one vehicle service from the call center in response to the determination, wherein the at least one vehicle service is implemented using the mobile device location data.

2. The method of claim 1, wherein the vehicle location data is received from a vehicle telematics unit.

3. The method of claim 1, wherein the receiving mobile device location data is in response to a push notification sent from the call center.

4. The method of claim 1, further comprises authenticating that the mobile device is associated with the vehicle.

5. The method of claim 1, wherein the vehicle location data and the mobile device location data each include at least one of the following: position data, clock data, or heading data.

6. The method of claim 5, wherein the vehicle position data and the mobile device position data includes at least one of the following: latitude data ($\phi$) and longitude data ($\lambda$); wherein the vehicle clock data and the mobile device clock data each include a timestamp data (ts) corresponding with their respective position datas; and wherein the vehicle heading data and the mobile device heading data includes at least one of the following: speed data (v) or velocity data ($\tilde{v}$).

7. The method of claim 6, wherein the determination of whether the mobile device is located within the vehicle is determined based at least in part on speed data (v) from the vehicle location data and a determined distance ($d_1$) the vehicle is estimated to have traveled during a latency between a first timestamp ($ts_1$) and a second timestamp ($ts_2$), wherein the first timestamp is associated with the vehicle location data and the second timestamp is associated with the mobile device's location data.

8. The method of claim 7, wherein the determination of whether the mobile device is located within the vehicle is determined based at least in part on a determined distance ($d_2$) which is associated with the position data of the vehicle and the position data of the mobile device.

9. The method of claim 8, wherein the determination further depends on whether the value of $d_1$ is within 40% of the value of $d_2$.

10. The method of claim 1, wherein receiving vehicle location data occurs during a call between the call center and the vehicle prior to the establishment of a voice call over a voice channel.

11. The method of claim 1, wherein the at least one vehicle service includes providing navigation assistance.

12. The method of claim 1, further comprising the step of periodically requesting updated mobile device location data from the mobile device and then receiving updated mobile device location data, wherein the initiating step is based upon the updated mobile device location data.

13. A method of receiving vehicle services based on the location data of a mobile device, comprising the steps of:
   initiating an opening of a voice channel or accepting an initiation of an opening of a voice channel for communication between a call center and a vehicle telematics unit;
   transmitting to the call center first location data associated with the vehicle, wherein the transmission is from the telematics unit over a data channel prior to opening the voice channel; and
   receiving a vehicle service initiated by the call center wherein the vehicle service is implemented using second location data associated with a mobile device that the call center has determined is within the vehicle, wherein the determination is made based upon the first location data and the second location data.

14. A method of providing a vehicle service to a vehicle based on the location data of a personal wireless device, comprising the steps of:
   receiving at a call center vehicle location data from a vehicle;
   receiving at the call center mobile device location data from a mobile device;

determining whether the mobile device is located within the vehicle based upon the vehicle location data and the mobile device location data; and when the mobile device is located within the vehicle, initiating at least one vehicle service from the call center in response to the determination;

wherein the vehicle location data and the mobile device location data each includes at least one of position data, clock data, or heading data, wherein the vehicle position data and the mobile device position data include at least one of latitude data ($\phi$) and longitude data ($\lambda$); the vehicle clock data and the mobile device clock data each include a timestamp data (ts) corresponding with their respective position data; and the vehicle heading data and the mobile device heading data include at least one of speed data (v) and velocity data ($\tilde{v}$).

\* \* \* \* \*